(12) United States Patent
Fellows et al.

(10) Patent No.: US 9,748,583 B2
(45) Date of Patent: Aug. 29, 2017

(54) FLOW FIELD PLATE FOR IMPROVED COOLANT FLOW

(71) Applicants: Daimler AG, Stuttgart (DE); Ford Motor Company, Dearborn, MI (US)

(72) Inventors: Richard Fellows, Vancouver (CA); Simon Farrington, Vancouver (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 224 days.

(21) Appl. No.: 14/274,833

(22) Filed: May 12, 2014

(65) Prior Publication Data
US 2014/0342264 A1 Nov. 20, 2014

Related U.S. Application Data

(60) Provisional application No. 61/825,051, filed on May 19, 2013.

(51) Int. Cl.
| | |
|---|---|
| *H01M 8/02* | (2016.01) |
| *H01M 8/10* | (2016.01) |
| *H01M 8/0267* | (2016.01) |
| *H01M 8/0258* | (2016.01) |
| *H01M 8/1018* | (2016.01) |
| *H01M 8/0206* | (2016.01) |

(52) U.S. Cl.
CPC ....... *H01M 8/0267* (2013.01); *H01M 8/0258* (2013.01); *H01M 8/0206* (2013.01); *H01M 2008/1095* (2013.01)

(58) Field of Classification Search
CPC .... H01M 8/02; H01M 8/0213; H01M 8/0267; H01M 8/0258
See application file for complete search history.

(56) References Cited

U.S. PATENT DOCUMENTS

| | | | | |
|---|---|---|---|---|
| 2004/0137309 A1* | 7/2004 | Allen | ........... | H01M 8/0228 429/514 |
| 2005/0058864 A1* | 3/2005 | Goebel | ........... | H01M 8/0228 429/434 |
| 2008/0050638 A1* | 2/2008 | Peng | ........... | H01M 8/0258 429/457 |
| 2008/0311461 A1* | 12/2008 | Farrington | ........... | H01M 8/0247 429/454 |
| 2009/0087695 A1* | 4/2009 | Silberbauer | ........... | H01M 8/1011 429/9 |
| 2011/0223450 A1* | 9/2011 | Horne | ........... | B60L 11/1824 429/72 |
| 2012/0295178 A1 | 11/2012 | Farrington et al. | | |

* cited by examiner

*Primary Examiner* — Kenneth Douyette
(74) *Attorney, Agent, or Firm* — Patent Central LLC; Stephan A. Pendorf

(57) ABSTRACT

Bipolar plate assemblies are disclosed in which the transition fuel channels are offset from the transition oxidant channels in the transition regions on the active sides of the plates. This configuration allows for a reduced pressure drop in the coolant flow in the transition regions on the inactive, coolant side of the plates and thereby improves coolant flow sharing. The assemblies are suitable for use in high power density solid polymer electrolyte fuel cell stacks.

12 Claims, 4 Drawing Sheets

FLOW FIELD PLATE FOR IMPROVED COOLANT FLOW

BACKGROUND

Field of the Invention

This invention relates to flow field plate designs for improving coolant flow by reducing the pressure drop in the coolant transition regions between the ports and the flow fields in bipolar plate assemblies for solid polymer electrolyte fuel cell stacks.

Description of the Related Art

Fuel cells such as solid polymer electrolyte or proton exchange membrane fuel cells electrochemically convert reactants, namely fuel (such as hydrogen) and oxidant (such as oxygen or air), to generate electric power. Solid polymer electrolyte fuel cells generally employ a proton conducting, solid polymer membrane electrolyte between cathode and anode electrodes. A structure comprising a solid polymer membrane electrolyte sandwiched between these two electrodes is known as a membrane electrode assembly (MEA). In a typical fuel cell, flow field plates comprising numerous fluid distribution channels for the reactants are provided on either side of a MEA to distribute fuel and oxidant to the respective electrodes and to remove by-products of the electrochemical reactions taking place within the fuel cell. Water is the primary by-product in a cell operating on hydrogen and air reactants. Because the output voltage of a single cell is of order of 1V, a plurality of cells is usually stacked together in series for commercial applications in order to provide a higher output voltage. Fuel cell stacks can be further connected in arrays of interconnected stacks in series and/or parallel for use in automotive applications and the like.

Along with water, heat is a significant by-product from the electrochemical reactions taking place within the fuel cell. Means for cooling a fuel cell stack is thus generally required. Stacks designed to achieve high power density (e.g. automotive stacks) typically circulate liquid coolant throughout the stack in order to remove heat quickly and efficiently. To accomplish this, coolant flow fields comprising numerous coolant channels are also typically incorporated in the flow field plates of the cells in the stacks. The coolant flow fields may be formed on the electrochemically inactive surfaces of the flow field plates and thus can distribute coolant evenly throughout the cells while keeping the coolant reliably separated from the reactants.

Bipolar plate assemblies comprising an anode flow field plate and a cathode flow field plate which have been bonded and appropriately sealed together so as to form a sealed coolant flow field between the plates are thus commonly employed in the art. The plates making up the assembly may optionally be metallic with appropriate corrosion resistant coatings and are typically produced by stamping the desired features into sheets of appropriate metal materials (e.g. certain stainless steels). Alternatively, the plates may be carbonaceous and are typically produced by molding features into plates made of appropriate moldable carbonaceous materials (e.g. polymer impregnated expanded graphite).

To provide both reactants and the coolant to and from the individual cells in the stack, a series of ports are generally provided at opposing ends of the individual cells such that when the cells are stacked together they form manifolds for these fluids. Further design features required then are passageways to distribute the bulk fluids to and from the various channels in the reactant and coolant flow field channels in the plates. Herein, the regions associated with the coolant are referred to as the coolant transition regions. The coolant transition regions can themselves comprise numerous fluid distribution channels, e.g. oxidant and/or fuel transition channels.

For ease of manufacture and other reasons, a common stack design employs a stack of generally rectangular, planar fuel cells whose flow field plates comprise numerous straight reactant and coolant flow field channels running from one end of the plates to the other. Further, it can be advantageous to employ a stack configuration in which certain of the ports are located on the side of the plates and thus are not in line with the flow field channels. Such a configuration however necessitates directing the associated fluid transverse to the flow field channels in order to fluidly connect the port to the flow field channels in the coolant transition regions. This can be accomplished by forming ducts transverse to any reactant transition channels in these coolant transition regions. As will be more apparent when discussing the Figures below, the presence of such ducts can impede the flow of other fluids in the coolant transition region. Thus, a trade-off can be required between flow through such ducts and flow through other transition channels.

This can be particularly of concern in high power density stack designs that comprise coolant ports located on the sides of the plates and coolant ducts in the coolant transition region that are directed transverse to the flow fields. To achieve the highest power densities, fluid channels are often formed at the limits of reliable manufacturing capability and tolerances. Being a liquid, the coolant flow is subject to greater pressure drops than a gaseous reactant when flowing through ducts or channels of a given size. As a result, the coolant pressure drop can be particularly significant in the coolant transition regions of such high power density stacks, and especially in wider cells where longer transverse coolant ducts must be employed. This can result in non-uniform distribution to and hence non-uniform sharing of the coolant in the coolant flow field channels in the active area of the fuel cell. This in turn increases the risk of overheating (hot spots) and over-drying in the cells on hot days. Also, it can lead to formation of wet spots in the cells, making it difficult to prepare the stack for shutdown in below freezing conditions and also difficult to recover during startup from below freezing conditions. In addition, a high coolant pressure drop necessitates use of a larger, more powerful coolant pump.

The pressure drop can be reduced to some extent by sacrificing space provided for the flow of reactants in the coolant transition region but, depending on port and transition designs, this can result in an unacceptable blocking of the flow of one or both of the reactants. Alternatively, the thickness of the individual fuel cells may be increased and, with it, the height of the coolant ducts in the coolant transition regions. However, the power density of the stack is then undesirably reduced, along with a possible undesirable increase in mass of the stack.

US20120295178 discloses a flow field plate design for improving the coolant flow and reducing the pressure drop associated with the coolant flow in the coolant transition regions of such fuel cell stacks. The pressure drop is reduced by enlarging the height of the coolant ducts in the transition region of the associated flow field plate so that the ducts extend beyond the plane of the plate. By reducing the pressure drop, improved coolant flow sharing is obtained. The height change can be accommodated by offsetting the ducts in adjacent cells in the stack. However unconventional non planar MEAs in this region are employed.

Despite the advances made to date, there remains a need for ever greater power density from fuel cell stacks and more efficient flow field plate designs. This invention represents an option for fulfilling these needs and provides further related advantages.

SUMMARY

The present invention provides for improved coolant flow and reduced pressure drop in the transition regions in a bipolar plate assembly without adversely affecting the flow of the reactants in the coolant transition regions and while maintaining the overall volume of the stack. This can be accomplished by offsetting the transition fuel channels from the transition oxidant channels in the transition regions. Consequently, this can be accomplished using conventional planar MEAs.

Specifically, a bipolar plate assembly of the invention has an anode plate, a cathode plate, and an internal coolant flow field for a fuel cell. The anode plate comprises inlet and outlet ports for each of fuel, oxidant, and coolant fluids; a fuel flow field comprising a transition region and an active region on the anode side of the anode plate in which the transition region comprises a plurality of transition fuel channels, the active region comprises a plurality of active fuel channels, and the transition fuel channels fluidly connect the active fuel channels to a fuel port; and a coolant flow field on the internal coolant side of the anode plate. In a like manner, the cathode plate comprises inlet and outlet ports for each of fuel, oxidant, and coolant fluids; an oxidant flow field comprising a transition region and an active region on the cathode side of the cathode plate in which the transition region comprises transition oxidant channels, the active region comprises active oxidant channels and the transition oxidant channels fluidly connect the active oxidant channels to an oxidant port; and a coolant flow field on the internal coolant side of the cathode plate. In the bipolar plate assembly, the internal coolant side of the anode plate is bonded to the internal coolant side of the cathode plate such that the active fuel channels align with the active oxidant channels, and the transition fuel channels are offset from the transition oxidant channels.

In a simple embodiment, the transition fuel channels and the transition oxidant channels are essentially straight and parallel in the transition region or regions and the active fuel channels and the active oxidant channels are essentially straight and parallel in the active regions. However, the fuel and oxidant channels necessarily bend at the interfaces between the transition and active channels thus are not straight in these brief interface areas between the transition regions and the active region in this embodiment.

In certain embodiments, the fuel flow field can comprise transition regions at both ends of the active region on the anode side of the anode plate and the oxidant flow field can comprise transition regions at both ends of the active region on the cathode side of the cathode plate.

Thin bipolar plate assemblies with anode and cathode plates made of metal can benefit from the invention via improved coolant flow sharing in the transition regions. Bipolar plate assemblies with anode and cathode plates made of carbon may also benefit however in that use of the invention may allow for thinner plates to be used.

The bipolar plate assemblies are particularly suitable for use in a solid polymer electrolyte fuel cell stack in which a series stack of membrane electrode assemblies is separated by a series of the bipolar plate assemblies. In such a stack, the bipolar plate assemblies comprise anode landings between the transition fuel channels and cathode landings between the transition oxidant channels, and the membrane electrode assemblies in the series stack can be compressed between the anode and cathode landings of the bipolar plate assemblies on either side of the membrane electrode assemblies. For this purpose, the anode landings of each bipolar plate assembly can desirably align with the cathode landings of the adjacent bipolar plate assembly in the series stack. This can be accomplished by employing a set of bipolar plate assemblies in which the set comprises assemblies having a first configuration and assemblies having a second configuration, and bipolar plate assemblies in the set are arranged such that the first configuration assemblies alternate with the second configuration assemblies in the series stack. In one embodiment, the first configuration assemblies can differ in construction from the second configuration assemblies. In an alternative embodiment however, the first configuration assemblies can have the same construction as the second configuration assemblies but the second configuration assemblies are rotated by 180 degrees about the stack axis with respect to the first configuration assemblies when assembled into the cell stack.

The bipolar plate assemblies can be readily manufactured using conventional techniques known to those skilled in the art. After having determined an appropriate design for the assembly, the anode and cathode plates are manufactured first and then the internal coolant side of the anode plate is bonded to the internal coolant side of the cathode plate.

These and other aspects of the invention are evident upon reference to the attached Figures and following detailed description.

BRIEF DESCRIPTION OF THE DRAWINGS

FIG. 3a shows the view in the active region of fuel cells in a prior art fuel cell stack. FIG. 3b shows the view in the transition region of fuel cells in a prior art fuel cell stack. FIG. 3c compares the view in the transition region of fuel cells in a fuel cell stack of the invention.

DETAILED DESCRIPTION

Figure 1:
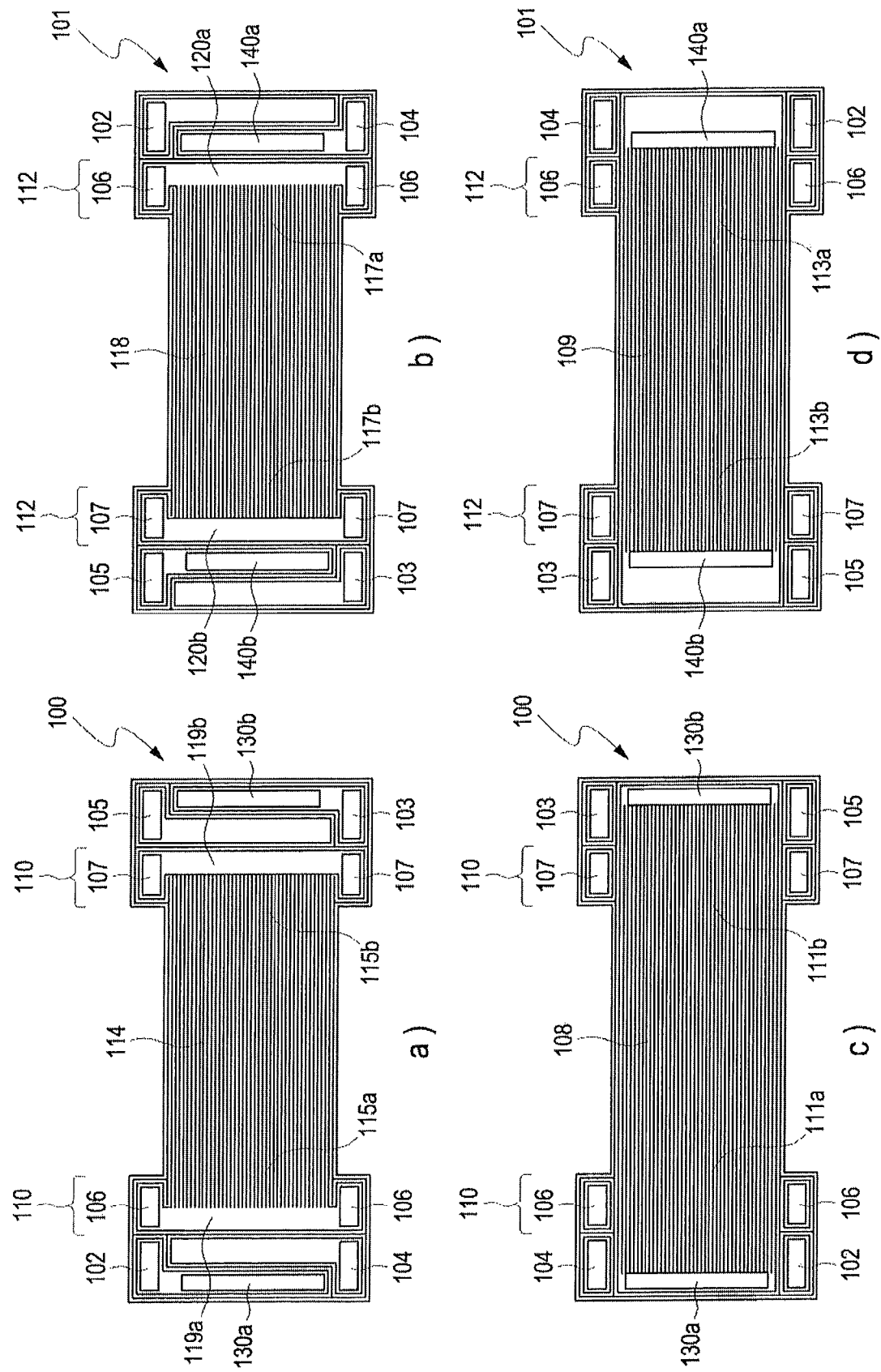
FIGS. 1a, b, c and d show schematic surface views of the coolant side of an anode flow field plate, the coolant side of a cathode flow field plate, the fuel side of the anode flow field plate, and the oxidant side of the cathode flow field plate respectively of a prior art solid polymer electrolyte fuel cell stack comprising coolant side feed ports and cross feed coolant ducts in the coolant transition regions of the flow field plates. (These Figures are reproductions of figures from US2012/0295178.)

In this specification, words such as "a" and "comprises" are to be construed in an open-ended sense and are to be considered as meaning at least one but not limited to just one.

Herein, in a quantitative context, the term "about" should be construed as being in the range up to plus 10% and down to minus 10%.

Throughout the specification, "active regions" refers to those areas in the fuel cell where the electrochemical reactions take place. "Transition regions" refer to those areas in the fuel cell next to the active regions and in which fluids (reactant and/or coolant) flow but the electrochemical reactions do not take place. "Active reactant channels" therefore refer to those portions of the reactant fluid channels in the flow field plates that are in active regions and which oppose active electrode surfaces in the fuel cell. "Transition reactant channels" refer to those portions of the reactant fluid channels in the flow field plates that are next to, and fluidly connect to, active reactant channels. "Transition channels" however do not oppose active electrode surfaces.

The term "offset" is used herein to describe alignment between different sets of channels. A given channel is considered to be offset from other channels when it is not in direct alignment with any of the other channels. While desirable for some reasons, an offset channel however need not, for instance, be centered at the midpoint between two other channels. Further, an offset channel may overlap another channel to some extent (e.g. if it is wider than the available space between the other channels or if not centred between the other channels). For present purposes, a given channel is considered offset from another channel if the amount of overlap of the given channel is 50% or less of the width of the other channel.

In the specification, the phrase "essentially straight and parallel" has been used to describe the channel geometry in certain embodiments in which the channels are straight and parallel throughout most, but not all, of the entire region referred to. Certain channels necessarily must "bend" over brief intervals in any embodiment of the invention.

A PEMFC stack design suitable for automotive purposes typically comprises a series stack of generally rectangular, planar PEM fuel cells. The fuel employed is usually pure hydrogen although other fuels may be considered. Air is usually provided as the oxidant. The individual PEM fuel cells comprise a membrane electrode assembly (MEA) of a polymer membrane electrolyte and two, usually noble metal based, catalyst layers on either side of the membrane electrolyte which serve as the anode and cathode respectively. Gas diffusion layers are usually provided adjacent the catalyst layers in the MEA for several purposes, e.g. to uniformly distribute reactant gases to and by-product fluids from the electrodes, to provide electrical connection to the electrodes, and to provide mechanical support. These gas diffusion layers are engineered porous, electrically conductive structures and typically comprise carbon fibres, binder, and materials to adjust the wetting characteristics of the layers. Flow field plates are then provided adjacent the anode and cathode gas diffusion layers to distribute bulk fluids to and from the gas diffusion layers, to provide mechanical support, to provide a manifold structure for the fluids delivered to and from the cell, and also to provide a structure for circulating liquid coolant to the fuel cells. Other specialized layers or sublayers may also be provided for various purposes in the structure (for instance, between electrode and gas diffusion layer or between gas diffusion layer and flow field plate).

FIGS. 1a, b, c, and d show schematic surface views of prior art flow field plates suitable for a high power density, automotive scale PEMFC stack. There are two types of plates involved, one for the anode side of the cell and one for the cathode side. FIGS. 1a and 1c show views of the opposing major surfaces of anode flow field plate 100, and FIGS. 1b and 1d show views of the opposing major surfaces of cathode flow field plate 101. (Note: FIGS. 1a, b, c, and d have been reproduced from US2012/295178.)

Both flow field plates have openings provided at opposite ends that serve as inlet and outlet ports for the various fluids being delivered to and from the cells. Seals are also employed around the various ports such that when a plurality of these cells are stacked together in series, the plurality of ports align and seal together so as to form manifolds for the various fluids within the stack. In FIGS. 1a, b, c, and d, the various ports shown are: fuel inlet 102, fuel outlet 103, oxidant inlet 104, oxidant outlet 105, two coolant inlets 106, and two coolant outlets 107. (For purposes of simplicity and clarity, the seal structures involved have been omitted from these Figures.)

FIGS. 1c and 1d show the major surfaces of anode flow field plate 100 and cathode flow field plate 101 that face the electrochemically active anode and cathode in the MEA respectively. In each of these plates, reactant flow fields have been formed comprising a plurality of generally linear flow field channels which extend from one end of the plate to the other. FIG. 1c shows numerous fuel flow field channels 108 which oppose the active area of an anode when assembled into a fuel cell. FIG. 1d shows numerous oxidant flow field channels 109 which oppose the active area of a cathode when assembled into a fuel cell. Between the reactant flow field channels in the plates and the various ports in the plates are coolant transition regions. In these coolant transition regions, various structures are provided for fluidly connecting the various ports to their appropriate flow field channels. In FIG. 1c, the coolant transition regions are denoted as 110. As shown, linear flow field channels 108 extend into coolant transition regions 110 at either end of flow field plate 100. These portions of the channels are denoted as fuel transition channels 111a, 111b. (In actual cells, other distribution structures are usually also formed in coolant transition regions 110 between fuel transition channels 111a, 111b and fuel inlet and outlet ports 102, 103. However, for clarity, these are not shown in FIG. 1c.) Fuel is provided to the associated fuel cell at fuel inlet port 102, is directed through fuel inlet backfeed port 130a to adjacent fuel transition channels 111a, directed through fuel flow field channels 108 and thus to the electrochemically active anode adjacent channels 108, and any remaining fuel and reaction by-products are directed from fuel transition channels 111b, through fuel outlet backfeed port 130b, to adjacent fuel outlet port 103.

In a like manner to FIG. 1c, the coolant transition regions in cathode plate 101 are denoted as 112. Linear flow field channels 109 extend into coolant transition regions 112 at either end of flow field plate 101. These portions of the channels are denoted as oxidant transition channels 113a, 113b. Oxidant therefore is provided to the associated fuel cell at oxidant inlet port 104, is directed through oxidant inlet backfeed port 140a to adjacent oxidant transition channels 113a, directed through oxidant flow field channels 109 and thus to the electrochemically active cathode adjacent channels 109, and any remaining oxidant and reaction by-products are directed from oxidant transition channels 113b, through oxidant outlet backfeed port 140b to adjacent oxidant outlet port 105.

As is typically done in the art, the other sides of flow field plates 100 and 101 are used cooperatively to create coolant flow fields for the cells in the stack. Specifically, for a given cell in the stack, the major surface of the coolant side of its anode flow field plate 100 (shown in FIG. 1a) cooperates with the major surface of the coolant side of the cathode flow field plate 101 (shown in FIG. 1b) of an adjacent cell in the stack to thereby create a coolant flow field. Typically, pairs of anode flow field plates 100 and cathode flow field plates 101 are bonded together to create flow field plate assemblies prior to assembling the rest of the fuel cell stack.

The view in FIG. 1a of anode flow field plate 100 is that of FIG. 1c except rotated 180 degrees about the long axis of the plate. Linear coolant flow field channels 114 are visible here and these extend into coolant transition regions 110 at either end of flow field plate 100. These portions of the channels are denoted as coolant transition channels 115a, 115b.

In a like manner, the view in FIG. 1b of cathode flow field plate 101 is that of FIG. 1d except rotated 180 degrees about the long axis of the plate. Linear coolant flow field channels 118 are visible here and these extend into coolant transition regions 112 at either end of flow field plate 101. These portions of the channels are denoted as coolant transition channels 117a, 117b.

In adjacent cells in the stack, the two surfaces shown in FIGS. 1a and 1b mate and cooperate to form a coolant flow field that is appropriately sealed from the rest of the cell and from the surrounding environment. Coolant is provided at the interface of these adjacent cells at coolant inlet ports 106 and has to be directed to adjacent coolant transition channels 115a, 117a, then directed through coolant flow field channels 114, 118, and then directed out from coolant transition channels 115b, 117b at the other end of the cells to adjacent coolant outlet ports 107.

As is evident in FIGS. 1a, b, c, and d, flow field plates 100, 101 have a side feed design for all of the fuel, the oxidant, and the coolant fluids. That is, fuel ports 102, 103, oxidant ports 104, 105 and coolant ports 104, 105 are located on the sides at the opposite ends of plates 100, 101 and are thus not in line with the linear flow fields 108, 109, 114, 118. As shown, a wide path is available in coolant transition regions 110 for fuel to be directed from fuel inlet backfeed port 130a to fuel transition channels 111a at the inlet end and directed from fuel transition channels 111b to fuel outlet backfeed port 130b at the outlet end of plate 100. However, there are no similar such wide paths available for fluidly connecting coolant ports 106, 107 to coolant transition channels 115a, 115b at each end of plate 100. Instead, coolant ducts 119a, 119b (in anode flow field plate 100) and 120a, 120b (in cathode flow field plate 101) are provided to make a fluid connection between coolant ports 106, 107 and coolant transition channels 115a, 115b, 117a, 117b.

Coolant ducts 119a, 119b, 120a and 120b are required to provide a reasonably sized path for coolant fluid to flow transverse to coolant flow field channels 114, 118 so that coolant is reasonably well distributed to and from all these channels. However, as better illustrated in the view of FIG. 2, the presence of the coolant ducts gets in the way of fuel and oxidant transition channels 111, 113 and vice versa.

Figure 2:
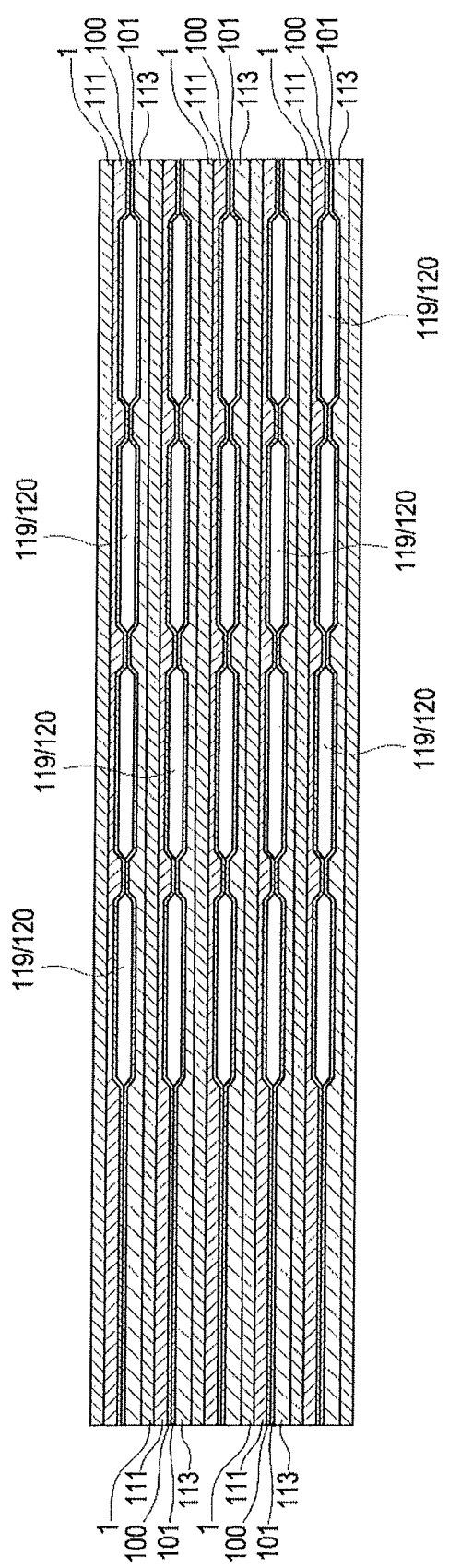
FIG. 2 shows a schematic lengthwise cross-sectional view of the coolant transition region and coolant ducts of a prior art solid polymer electrolyte fuel cell stack comprising coolant side feed ports and multiple transverse coolant ducts in the coolant transition region of the flow field plates.

FIG. 2 shows a schematic lengthwise cross-sectional side view of coolant transition regions 110, 112 near one end of a few cells in the fuel cell stack. Unlike FIG. 1 however, this prior art embodiment employed multiple transverse coolant ducts. In FIG. 2, vertical represents the stack direction, and horizontal represents the direction of the linear flow field channels 108, 109, 114, 118. The right side of FIG. 2 is near an end of the stack (the actual edge of the stack is not shown in FIG. 2). Each cell comprises a MEA 1, fuel transition channel 111, and oxidant transition channel 113. Anode flow field plates 100 are bonded to cathode flow field plates 101 to form flow field plate assemblies and a plurality of closed coolant ducts 119/120 are formed within these flow field plate assemblies. (Note: coolant duct 119 of anode flow field plate 100 mates with coolant duct 120 of cathode flow field plate 101 to create the closed ducts shown in FIG. 2. The inside height of the created closed duct is thus determined by the sum of the depth of the duct formed in plate 100 plus the depth of the duct formed in plate 101.)

As is evident in FIG. 2, any vertical height devoted to the size of closed coolant ducts 119/120 serves to restrict the flow of reactant in fuel transition channels 111 and oxidant transition channels 113, or vice versa. Thus, when trying to provide the highest power density (and hence minimum size) fuel cell stack, a trade-off must be made between reactant flow capability and coolant flow capability in the coolant transition regions. In practice, a plurality of coolant ducts 119/120 may be employed in order to obtain a satisfactory flow of coolant transverse to the various linear flow fields, without unacceptably blocking reactant flows in transition channels 111, 113.

In the prior art flow field plates shown in FIGS. 1 and 2, the surfaces of the plates are generally planar throughout and, as partly shown in FIG. 2, MEAs 1 in the individual cells are also generally planar throughout the cells.

Figure 3A:
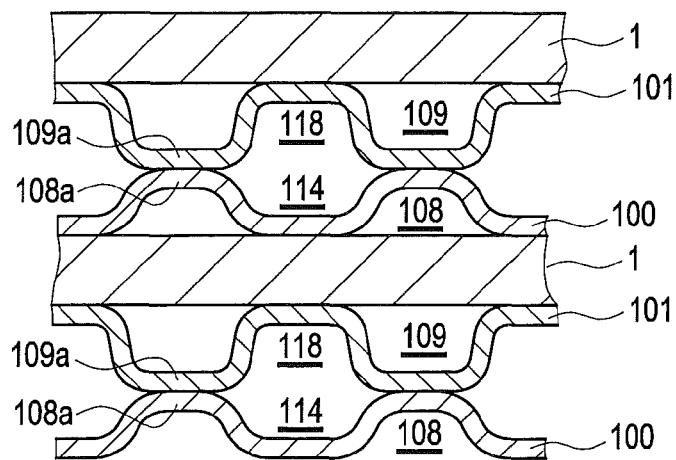
FIGS. 3a, 3b and 3c show several schematic widthwise cross-sectional views of a few cells in different fuel cell stacks.
Figure 3B:
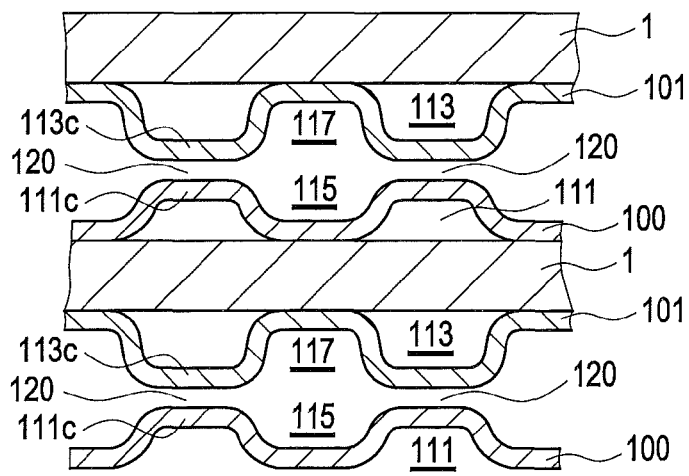

FIGS. 3a and 3b show representative, schematic, widthwise cross-sectional views of a prior art fuel cell stack in the active region and in the transition region respectively (two sets of cell components in the stack are shown). Using like numerals from FIGS. 1a-d to identify components, the view in FIG. 3a shows MEAs 1, anode flow field plates 100, and cathode flow field plates 101. Active fuel flow field channels 108 oppose the anode side of MEAs 1 and active oxidant flow field channels 109 oppose the cathode side of MEAs 1. Coolant flow field channels 114 and 118 are mated together to form coolant flow fields between pairs of plates 100 and 101.

As is evident from FIG. 3a, there is no opportunity for transverse flow of coolant in this active region (i.e. crossflow between adjacent coolant channels) because the bottoms of the active fuel flow field channels 108a are butted against the bottoms of the active oxidant flow field channels 109a.

In order to provide for some modest transverse flow of coolant in the transition region then, either or both of the transition fuel and oxidant channels are made shallower as is shown in the view of FIG. 3b. In FIG. 3b, both transition fuel flow field channels 111 and transition oxidant flow field channels 113 are shallower than the channels shown in FIG. 3a. Gaps 120 therefore exist between the bottoms of the transition fuel flow field channels 111c and transition oxidant flow field channels 113c. And thus, gaps 120 allow for a modest, restricted transverse flow of coolant as shown generally by the arrow. Preferably however, a desired transverse flow of coolant is obtained without restricting flow in the fuel and oxidant channels in this region.

Figure 3C:
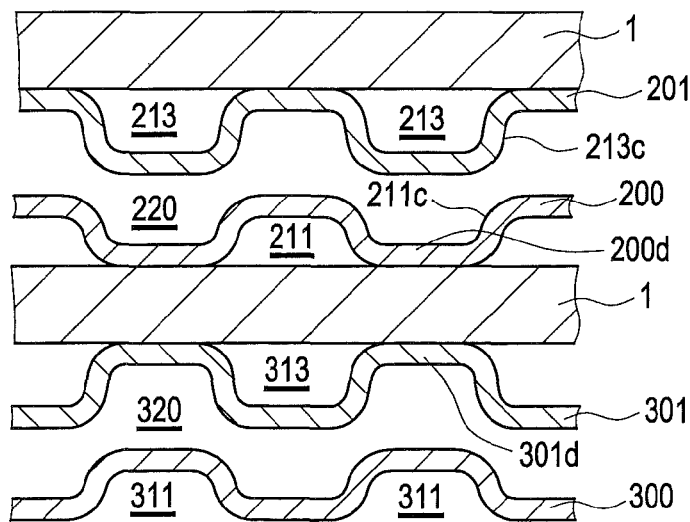

FIG. 3c shows a schematic cross-sectional view in the transition region of a fuel cell stack of the invention. As before, MEAs 1 appear in FIG. 3c. However, two differently configured bipolar plate assemblies are employed. In the first configuration, anode flow field plate 200 is combined with cathode flow field plate 201. In the second configuration, anode flow field plate 300 is combined with cathode flow field plate 301.

Each of the first and second configurations contain transition fuel flow field channels 211 and 311 respectively, and transition oxidant flow field channels 213 and 313 respectively. Here however, the channels in each flow field plate are offset from the channels in its partner plate in the bipolar plate assemblies. For instance, transition fuel flow field channels 211 are offset from (and nest between) transition oxidant flow field channels 213. As depicted in FIG. 3c, the transition fuel flow field channels in each set of bipolar plate assemblies are offset such that they are centrally located between the transition oxidant flow field channels of their partner cathode plates. Also as depicted, there is some overlap still between these channels in the areas around the channel walls. For instance, channel walls 211c of transition fuel flow field channels 211 overlap with channel walls 213c of transition oxidant flow field channels 213. In other embodiments though, the channels may not be offset centrally and there may be more or less channel overlap.

Mainly, the inventive approach provides for greater opportunity for transverse coolant flow with less restriction required in the reactant channels. As shown in FIG. 3c, larger continuous "gaps" 220, 320 are now provided between plates in the first and second configurations respectively. Further, using appropriate first and second configurations for the bipolar plate assemblies provides a design in which the MEAs can still be compressed between the anode landings and cathode landings in the transition regions (e.g. as exemplified by MEA 1 being compressed between anode landing 200d and cathode landing 301d in FIG. 3c).

As will be evident to those skilled in the art, the offset or nesting between channels, the depth of the transition fuel and oxidant flow field channels, and other channel dimensions can be adjusted to improve certain characteristics at the expense of others. Appropriate adjustment will depend on individual circumstances and can be expected from those of ordinary skill.

Figure 4A:
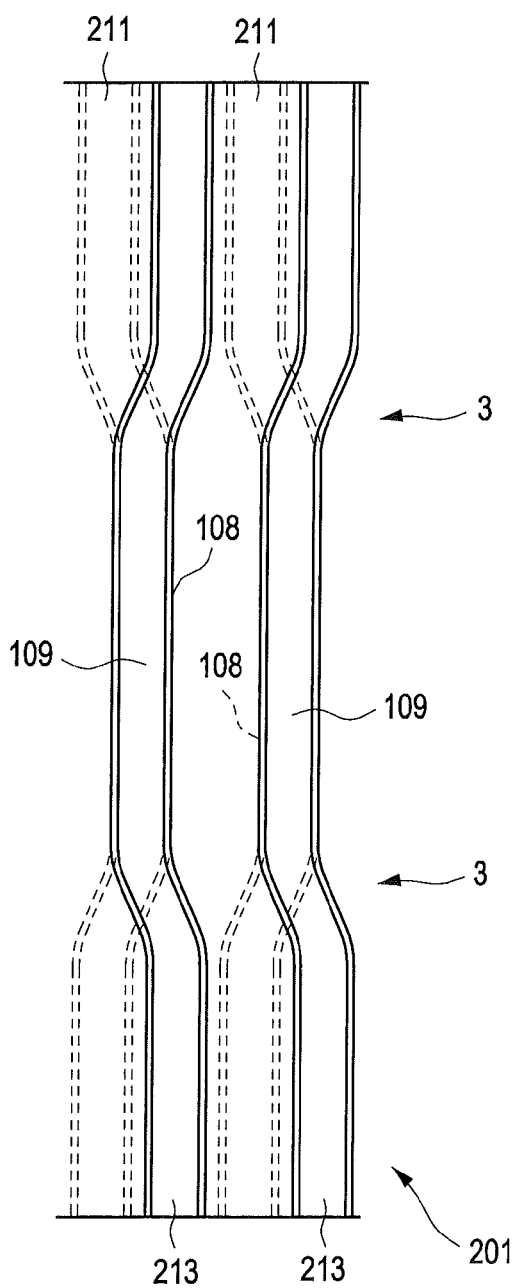
FIGS. 4a and 4b show schematic plan views of the cathode sides of a bipolar plate assembly having a first configuration and a bipolar plate assembly having a second configuration respectively. Together, these bipolar plate assemblies can be used to make a fuel cell stack in which the MEAs are compressed between the anode and cathode landings in the transition regions.
Figure 4B:
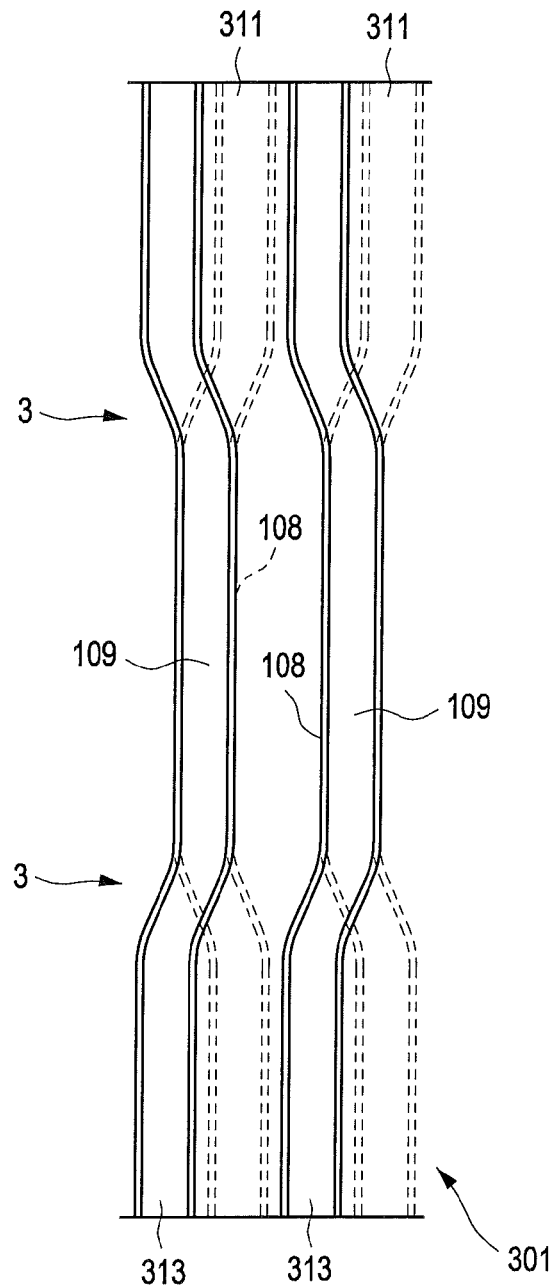

The active region of a fuel cell stack of the invention can be made essentially identical to that of a stack of the prior art (e.g. have the same cross-section shown in FIG. 3a). FIGS. 4a and 4b show schematic plan views of the whole cathode sides of the bipolar plate assemblies appearing in FIG. 3c. Facing the reader are cathode flow field plates 201 and 301 in FIGS. 4a and 4b respectively. Transition oxidant flow field channels 213 and active oxidant flow field channels 109 are visible on cathode flow field plate 201. Transition oxidant flow field channels 313 and active oxidant flow field channels 109 are visible on cathode flow field plate 301. As shown, these channels are essentially straight and parallel throughout except where they necessarily bend at the interfaces 3 between the transition regions and active regions on the plates.

To illustrate the relative alignment of the oxidant channels with respect to the fuel channels, outlines of the fuel channels which are present on the opposite sides of the bipolar plate assemblies are shown in dashed lines in FIGS. 4a and 4b. That is, transition fuel flow field channels 211 and active fuel flow field channels 108 on the anode flow field plate are shown in dashed lines. In a like manner, transition fuel flow field channels 311 and active fuel flow field channels 108 on the anode flow field plate are shown in dashed lines. Together, these bipolar plate assemblies can be used to make a fuel cell stack with improved coolant flow sharing in the transition regions. And this can be accomplished while maintaining adequate flow of reactants and while still compressing the MEAs between the anode and cathode landings in the transition regions.

While two different configurations for the bipolar plate assemblies are required to prepare such a stack, it is apparent from FIGS. 4a and 4b that the assemblies can otherwise have the same construction. The assemblies in these two figures have the same construction but the assembly in FIG. 4b is rotated 180 degrees about the normal to the page (i.e. about the fuel cell stack axis) relative to the assembly in FIG. 4a.

The following example is illustrative of the invention but should not be construed as limiting in any way.

EXAMPLE

Analyses were performed to compare the expected pressure drop for the coolant in a conventional fuel cell to the pressure drop expected in an exemplary fuel cell of the invention. The conventional fuel cell was assumed to be of a design similar to that shown in FIGS. 2, 3a, and 3b and intended for use in a high power density automotive application. The inventive fuel cell was assumed to be similar to that of the conventional fuel cell except that the transition fuel channels were offset from the transition oxidant channels as shown in FIGS. 3c and 4.

In operation, reactant and coolant flows typical for such high power density automotive applications were also assumed. Computational fluid dynamics methods were then used to determine the expected pressure drops for the coolant in the transition and active regions in the two fuel cell designs.

In both fuel cells, the coolant pressure drop in the active region was determined to be about 44 mB. In the conventional fuel cell, the pressure drop in each transition region at each end of the cell was about 93 mB (implying the total pressure drop in the conventional fuel cell was about 230 mB). In the inventive fuel cell, the pressure drop in each transition region at each end of the cell was about 51 mB (implying the total pressure drop in the inventive fuel cell was about 145 mB).

The coolant pressure drop in the transition regions of the inventive fuel cell was thus about 45% less than that in the transition regions of the conventional fuel cell, thereby providing substantially improved coolant distribution to the channels in the active region. Further, the total pressure drop for the coolant in the active region of inventive fuel cell was about 37% less than that for the coolant in the conventional cell, thereby reducing the pressure requirement from the coolant pump required in the associated automotive fuel cell system. In turn, this allows for the use of a coolant pump which is smaller, less expensive, and which uses less power.

All of the above U.S. patents, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. For instance, while the preceding description was primary directed at embodiments comprising carbonaceous oxidant flow field inserts, it may be desirable for other reasons to consider embodiments comprising carbonaceous fuel flow field inserts. Such modifications are to be considered within the purview and scope of the claims appended hereto.

What is claimed is:

1. A bipolar plate assembly having an internal coolant flow field for a fuel cell, the bipolar plate assembly comprising:
   an anode plate comprising:
      inlet and outlet ports for each of fuel, oxidant, and coolant fluids;
      a fuel flow field comprising a transition region and an active region on the anode side of the anode plate wherein the transition region comprises a plurality of transition fuel channels, the active region comprises a plurality of active fuel channels, and the transition fuel channels fluidly connect the active fuel channels to a fuel port; and
a coolant flow field on an internal coolant side of the anode plate;
a cathode plate comprising:
inlet and outlet ports for each of fuel, oxidant, and coolant fluids;
an oxidant flow field comprising a transition region and an active region on the cathode side of the cathode plate wherein the transition region comprises transition oxidant channels, the active region comprises active oxidant channels and the transition oxidant channels fluidly connect the active oxidant channels to an oxidant port; and
a coolant flow field on an internal coolant side of the cathode plate;
wherein the internal coolant side of the anode plate is bonded to the internal coolant side of the cathode plate, so that the anode plate and the cathode plate are combined with each other and form partner plates in the bipolar plate assembly; and wherein
the active fuel channels align with the active oxidant channels, and
the transition fuel channels of the anode plate are offset from, transverse to the direction of flow of the channels in the active regions, and nest between, the transition oxidant channels of their partner cathode plate, and vice versa, so that gaps exist between the bottoms of the transition fuel channels of the anode plate and the transition oxidant channels of their partner cathode plate which allow for a flow of coolant transverse to the transition fuel channels of the anode plate and to the transition oxidant channels of their partner cathode plate.

2. The bipolar plate assembly of claim 1 wherein the transition fuel channels and the transition oxidant channels are straight and parallel in the transition regions and the active fuel channels and the active oxidant channels are straight and parallel in the active regions.

3. The bipolar plate assembly of claim 1 wherein the fuel flow field comprises transition regions at both ends of the active region on the anode side of the anode plate and the oxidant flow field comprises transition regions at both ends of the active region on the cathode side of the cathode plate.

4. The bipolar plate assembly of claim 1 wherein the anode and cathode plates are made of metal.

5. A solid polymer electrolyte fuel cell stack comprising a series stack of membrane electrode assemblies separated by a series of the bipolar plate assemblies of claim 1.

6. The solid polymer electrolyte fuel cell stack of claim 5 wherein the bipolar plate assemblies comprise anode landings between the transition fuel channels and cathode landings between the transition oxidant channels, and the membrane electrode assemblies in the series stack are compressed between the anode and cathode landings of the bipolar plate assemblies on either side of the membrane electrode assemblies in the transition regions.

7. The solid polymer electrolyte fuel cell stack of claim 6 wherein the anode landings of each bipolar plate assembly align with the cathode landings of the adjacent bipolar plate assembly in the series stack.

8. The solid polymer electrolyte fuel cell stack of claim 7 wherein the bipolar plate assemblies comprise assemblies having a first configuration and assemblies having a second configuration, and the bipolar plate assemblies are arranged such that the first configuration assemblies alternate with the second configuration assemblies in the series stack.

9. The solid polymer electrolyte fuel cell stack of claim 8 wherein the first configuration assemblies differ in construction from the second configuration assemblies.

10. The solid polymer electrolyte fuel cell stack of claim 8 wherein the first configuration assemblies have the same construction as the second configuration assemblies and the second configuration assemblies are rotated 180 degrees about the stack axis with respect to the first configuration assemblies.

11. A method for improving coolant flow in a bipolar plate assembly having an internal coolant flow field for a fuel cell, wherein the bipolar plate assembly comprises
an anode plate comprising:
inlet and outlet ports for each of fuel, oxidant, and coolant fluids;
a fuel flow field comprising a transition region and an active region on the anode side of the anode plate wherein the transition region comprises a plurality of transition fuel channels, the active region comprises a plurality of active fuel channels, and the transition fuel channels fluidly connect the active fuel channels to a fuel port; and
a coolant flow field on an internal coolant side of the anode plate;
a cathode plate comprising:
inlet and outlet ports for each of fuel, oxidant, and coolant fluids;
an oxidant flow field comprising a transition region and an active region on the cathode side of the cathode plate wherein the transition region comprises transition oxidant channels, the active region comprises active oxidant channels and the transition oxidant channels fluidly connect the active oxidant channels to an oxidant port; and
a coolant flow field on an internal coolant side of the cathode plate;
the method comprising:
manufacturing the anode plate and the cathode plate such that the active fuel channels align with the active oxidant channels, and the transition fuel channels of the anode plate are offset from, transverse to the direction of flow of the channels in the active regions, and nest between, the transition oxidant channels of their partner cathode plate so that the anode plate and the cathode plate are combined with each other and form partner plates in the bipolar plate assembly, and vice versa, so that gaps exist between the bottoms of the transition fuel channels of the anode plate and the transition oxidant channels of their partner cathode plate which allow for a flow of coolant transverse to the transition fuel channels of the anode plate and to the transition oxidant channels of their partner cathode plate; and
bonding the internal coolant side of the anode plate to the internal coolant side of the cathode plate.

12. The bipolar plate assembly of claim 1, wherein the transition fuel channels and the transition oxidant channels have the same cross sectional area as the active fuel channels and the active oxidant channels.

* * * * *